US006396827B1

(12) United States Patent
Paivike et al.

(10) Patent No.: US 6,396,827 B1
(45) Date of Patent: May 28, 2002

(54) MULTI-MODE MOBILE APPARATUS AND METHOD FOR CALCULATING FRAME/TIME SLOT OFFSETS, AND ALLOWING MOBILES TO SYNCHRONIZE WITH DIFFERENT MOBILE PROTOCOLS/SCHEMES (75) Inventors: Heikki Paivike, Coppell; Riku Pirhonen, Irving, both of TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/205,539

(22) Filed: Dec. 3, 1998

Related U.S. Application Data (60) Provisional application No. 60/089,412, filed on Jun. 16, 1998.

(51) Int. Cl.[7] .............................................. H04B 7/212
(52) U.S. Cl. ....................................... 370/347; 370/466
(58) Field of Search ................................. 370/310, 321, 370/328, 327, 337, 347, 458, 465–67, 503, 506–7, 498, 509, 510, 512, 522

(56) References Cited

U.S. PATENT DOCUMENTS

| 5,329,530 | A | * | 7/1994 | Kojima | 370/348 |
| 5,734,980 | A | | 3/1998 | Hooper et al. | 455/434 |
| 5,790,527 | A | * | 8/1998 | Janky et al. | 370/321 |
| 6,185,198 | B1 | * | 2/2001 | LaDue | 370/329 |
| 6,252,868 | B1 | * | 6/2001 | Diachina et al. | |
| 6,338,140 | B1 | * | 1/2002 | Owens et al. | 380/255 |

FOREIGN PATENT DOCUMENTS

EP   0 818 938 A2   1/1998

* cited by examiner

Primary Examiner—David Vincent
(74) Attorney, Agent, or Firm—Steven Shaw (57) ABSTRACT Apparatus, and an associated method, for a UWC-136 HS communication system is provided. A synchronization signal generated by the network infrastructure, constructed generally corresponding to the existing IS-136/136+ standard is received by a mobile station operable, generally, pursuant to the timing scheme defined in a GSM system. A relative timing offset between the timing schemes of the respective communication system schemes is determined and thereafter utilized for purposes of synchronization.

22 Claims, 7 Drawing Sheets

1)=CURRENT IS-136 FRAME NUMBER
2)=CURRENT IS-136 TIMESLOT NUMBER
3)=GSM FRAME NUMBER AT 1)
4)=GSM FRAME NUMBER AND TIMESLOT ORIGINATE FROM TIMESLOT_ALLOCATION+ TBF_STARTING_TIME PARAMETERS OF PACKET UPLINK OR DOWNLINK ASSIGNMENT MESSAGE
5)=TIME DIFFERENCE BETWEEN 1)+2) AND 4)

MULTI-MODE MOBILE APPARATUS AND METHOD FOR CALCULATING FRAME/TIME SLOT OFFSETS, AND ALLOWING MOBILES TO SYNCHRONIZE WITH DIFFERENT MOBILE PROTOCOLS/SCHEMES

CROSS-REFERENCE TO RELATED APPLICATION

The present application claims the priority of provisional patent application No. 60/089,412, filed on Jun. 16, 1998, the contents of which are incorporated herein by reference.

The present invention relates generally to a manner by which to synchronize a mobile station in a radio communication system. More particularly, the present invention relates to apparatus, and an associated method, by which a synchronization signal generated by apparatus operable pursuant to a first cellular communication standard can be used to synchronize a mobile station operable pursuant to a second cellular communication standard. An embodiment of the present invention is advantageously utilized in the implementation of a so-called 3G (third generation) cellular communication system. The infrastructure of an existing IS-136 cellular communication system can be utilized to synchronize a mobile station which is operable pursuant to a time frame format defined in a GSM cellular communication system.

BACKGROUND OF THE INVENTION

In recent years, the utilization of wireless communication systems through which to communicate telephonically has achieved wide popularity. Conventional, voice communications as well as data communications can be effectuated telephonically through the use of such wireless communication systems.

In a wireless communication system, the communication channel formed between a sending and a receiving station is a radio channel, formed of a portion of the electromagnetic spectrum. A wire line connection is not required to effectuate the communication of a communication signal between the sending and receiving stations. Thereby, communication by way of a wireless communication system is possible at a location to which formation of a wire line connection would be impractical or impossible.

Cellular communication systems have been implemented using various communication schemes. Cellular communication systems have been developed which utilize, for example, FDMA (frequency-division, multiple-access), TDMA (time-division, multiple-access), CDMA (code-division, multiple-access) techniques, and various combinations of such techniques.

A cellular communication system includes network infrastructure which includes a plurality of spaced-apart base stations, formed of fixed-site radio transceivers. A user communicates with the infrastructure of a cellular communication network through the use of a radio telephone, typically referred to as a mobile station. The mobile station receives downlink signals on a forward link and transmits uplink signals on a reverse link. Thereby, two-way communications are provided between the infrastructure of the cellular communication network and the mobile station.

With continued improvements in communication technologies and the development of improved circuitry by which to implement such technologies, improvements to cellular communication systems have been proposed. Some proposals pertain to a so-called 3G (third generation) cellular communication standard. Such proposals for the 3G standard are intended to provide a cellular standard permitting universal implementation of a cellular system which shall be able to take advantage of the improved communication technologies to provide a system permitting increased capacity levels of communications and which provide increased communication services.

One such proposal is the UWC-136 HS (Universal Wireless Communications Consortium-136 High Speed) system. In this proposal, certain ones of the technologies and standards promulgated in two existing cellular communication systems are integrated together. Namely, the proposed, UWC-136 HS system integrates together components, and operation, of the existing IS-136/136+ communication system and the GSM/GPRS/EDGE (global system for mobile communications/general packet radio service/enhanced data rates for GSM evolution) system.

A problem associated with such integration is due to dissimilarities of the time frame structures defined in the systems. That is to say, the time frame structure of the IS-136/136+ system and the GSM system are dissimilar. Although both systems are TDMA (time-division, multiple-access) systems, the frames defined in the respective systems are of dissimilar lengths. A frame is a group of time slots. Channels defined in a TDMA system are defined, in part, in terms of the time slots during which signal bursts are transmitted. Both of the systems also define superframes to be groups of frames, and hyperframes to be groups of superframes. But, the superframe lengths and hyperframe lengths are defined to be of dissimilar lengths in their respective systems.

IS-136 and GSM standards define different signals to be used by the mobile in synchronization to the system. In GSM the common control channels are used for synchronization. These channels are SCH (synchronization channel), FCCH (frequency correction channel) and (P)BCCH ((Packet) Broadcast Control Channel). These common control channels are sent in a GSM cell on downlink Carrier CO on its time slot 0. To enable synchronization and measurements by the mobile this carrier needs to be sent constantly at constant power by the base station.

And, the signal bandwidths of signals generated in the different systems are of differing bandwidths. In the IS-136 standard, channels are defined to be of 30 kilohertz bandwidths. And, in the GSM standards, channel bandwidths are of 200 kilohertz bandwidths.

When integrating the standards together to form the UWC-136 HS system, it would be beneficial if the IS-136 DCCH signal could be utilized in synchronization of the mobile to the 200 kHz GSM/GPRS/EDGE carrier. Synchronization of the mobile station from IS-136 DCCH to the 200 kHz carrier could be done quicker than by using the GSM synchronization signals. Also, existing plans for the implementation of the UWC-136 HS system allocates only a limited portion of the electromagnetic spectrum within which to define radio channels. Implementation proposals for the United States, for instance, provide only one megahertz of spectrum, thus necessitating a high level of channel reuse, such as on a 1/3 cell reuse pattern. The common control channels set forth in the existing GSM standard when broadcast in a system utilizing a 1/3 cell reuse pattern might result in excessive levels of interference. A 3G system necessitating a reduced level of signaling, relative to that utilized in a conventional GSM system, would be advantageous.

A manner by which to permit synchronization of a mobile station with the synchronization signals defined in the IS-136 system would advantageously permit synchronization to be performed more quickly and also obviate the need for certain of the synchronization signals utilized in a GSM communication system. The common control channels require bandwidth on the GSM carrier. In a low capacity initial deployment of 136HS it would be beneficial if this bandwidth could be used for packet data transfer. This capacity increase may be possible by using information present on the 30 kHz DCCH in synchronization to the GSM/GPRS/EDGE channel.

The UWC-136HS system will have both the EDGE coverage and 136 coverage in the area of the same cell. This means that the IS-136/136+ and GSM/EDGE base station transceivers will be located in the same cell site. From this perspective it does not seem reasonable that a mobile would need to use time to synchronize to a 200 kHz carrier on a cell where it already has synchronized to the 30 kHz carrier. A faster way would be to utilize information on the 30 kHz channel to make synchronization to the 200 kHz carrier faster.

It is in light of this background material related to synchronization between a mobile station and network infrastructure of a cellular communication system that the significant improvements of the present invention have evolved.

SUMMARY OF THE INVENTION

The present invention, accordingly, advantageously provides apparatus, and an associated method, by which a synchronization signal generated by apparatus operable pursuant to a first cellular communication standard can be used to synchronize a mobile station operable pursuant to a second cellular communication standard.

In one implementation, synchronization signals are generated corresponding to standards set forth in the IS-136/136+ interim standard promulgated by the EIA/TIA, and the mobile station is constructed to be operable pursuant to the standards set forth in the GSM (global system for mobile communications) cellular communication standard. Another possible implementation is a multi-mode mobile station capable of operating both according to the IS-136 and/or GSM and/or GPRS and/or EDGE communication standards. Operation of an embodiment of the present invention determines a relative time offset between a frame and time slot on the IS-136 DCCH and a frame and time slot on a GSM/GPRS/EDGE network infrastructure. Responsive to determination of the relative time offset, the mobile station can be placed in time synchronization with the signals generated by the GSM/GPRS/EDGE network infrastructure.

Such an implementation can be utilized, for instance, in the proposed, UWC-136 HS (Universal Wireless Consortium-136 High Speed) cellular communication system, a proposed 3G (third generation) cellular communication system. The infrastructure of an existing IS-136 cellular communication system can be utilized in the newly-proposed system in which the signals formed during operation of the infrastructure correspond to a time frame format defined in the IS-136 communication system.

By utilizing the synchronization signals generated upon the 30 kilohertz carriers defined in the IS-136 system, synchronization of a mobile station to GSM signals can be effectuated more quickly than through synchronization of the mobile station using the GSM, FCCH and SCH channels. Also, through use of the signaling utilized in an IS-136 system, lesser levels of co-channel interference are likely to occur, and smaller cluster sizes, such as those formed pursuant to 1/3 cell reuse patterns, are possible.

Additionally, in the aforementioned, proposed UWC-136 HS system, because control channels conventionally utilized in an existing GSM system are obviated, the bandwidth conventionally required to be reserved for signaling can be used for other purposes. Such channels can be reallocated and used, for example, instead to communicate packet data.

An embodiment of the present invention takes advantage of the close relationship between the multi-frame timing of an IS-136 network and that of a GSM/GPRS/EGPRS network. A period of time can be determined in which both the IS-136 and GSM multi-frames are recurrent. And, analogously, also, a period of time can be determined in which an IS-136 hyperframe and a GSM hyperframe are recurrent. Because of this recurrent relationship, timing differences between slots and frames of the two separate systems are calculable. And, responsive to calculation of the timing differences, synchronization of a mobile station constructed pursuant to the standards of a GSM system can be synchronized through the synchronization signals of the infrastructure constructed pursuant to the standards of the IS-136 system. That is to say, a mobile station that is "camping on" the DCCH of an IS-136 base station can use the synchronization signal generated thereon to become synchronized to the GSM/GPRS/EGPRS channels of the same cell. With only a few additions to the BCCH information on the DCCH, a mobile station is able to calculate the timing differences between the slots and frames of the DCCH and the slots and frames of a GSM/GPRS/EDGE carrier and use such data for purposes of channel synchronization. Thereby, the FCCH and SCH control channels of a GSM system can be replaced with information generated on a DCCH defined in the IS-136 system.

During operation of an embodiment of the present invention, advantage is taken of the fact that the GSM hyperframe length is an integral multiple of IS-136 hyperframe length and that the GSM 26-multiframe length equals to the length of three IS-136 frames. These relationships make it easy to calculate the time difference from any given IS-136 frame-time slot to any given GSM frame/time slot. This idea can be used in the context of a mobile station that needs to work according to both the GSM and IS-136 standards. This will be the case in the UWC-136HS system where the base station will incorporate both GSM and IS-136 base stations. To use this idea synchronization of the GSM and IS-136 forward channels is needed on a cell site only (not network wide). Also, the IS-136 DCCH frame number is extended to count over GSM hyperframe. The same idea applies to any two TDMA systems in case the hyperframe of one is an integral multiple of the hyperframe of the other.

In these and other aspects, therefore, the apparatus, and an associated method, is provided for calculating a relative time offset by which to offset a synchronization signal generated in a communication system by network infrastructure which is operable pursuant to a first TDMA (time-division, multiple-access) communication scheme having a first time frame definition defined therein. The mobile station is operable pursuant to a second TDMA communication scheme having a second time frame definition defined therein. A determiner is coupled to receive the synchronization signal and is operable responsive thereto. The determiner determines an order number representative of a first-communication scheme time frame located within a sequence of the first-communication-scheme time frame at a selected determining time. A converter is operable responsive to the order number determined by the determiner. The converter converts the order number to a corresponding frame number of a second-communication-scheme time frame number. A timing offset calculator is operable responsive to a value representative of the second-communication-scheme time frame number formed by the converter. The timing offset calculator calculates a relative time offset between a first time frame of the sequence of the first-communication-scheme time frames in which the first-communication-scheme time frame, the order number of which the determiner determines, is located, and a first time frame of a corresponding sequence of second communication-scheme time frames.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
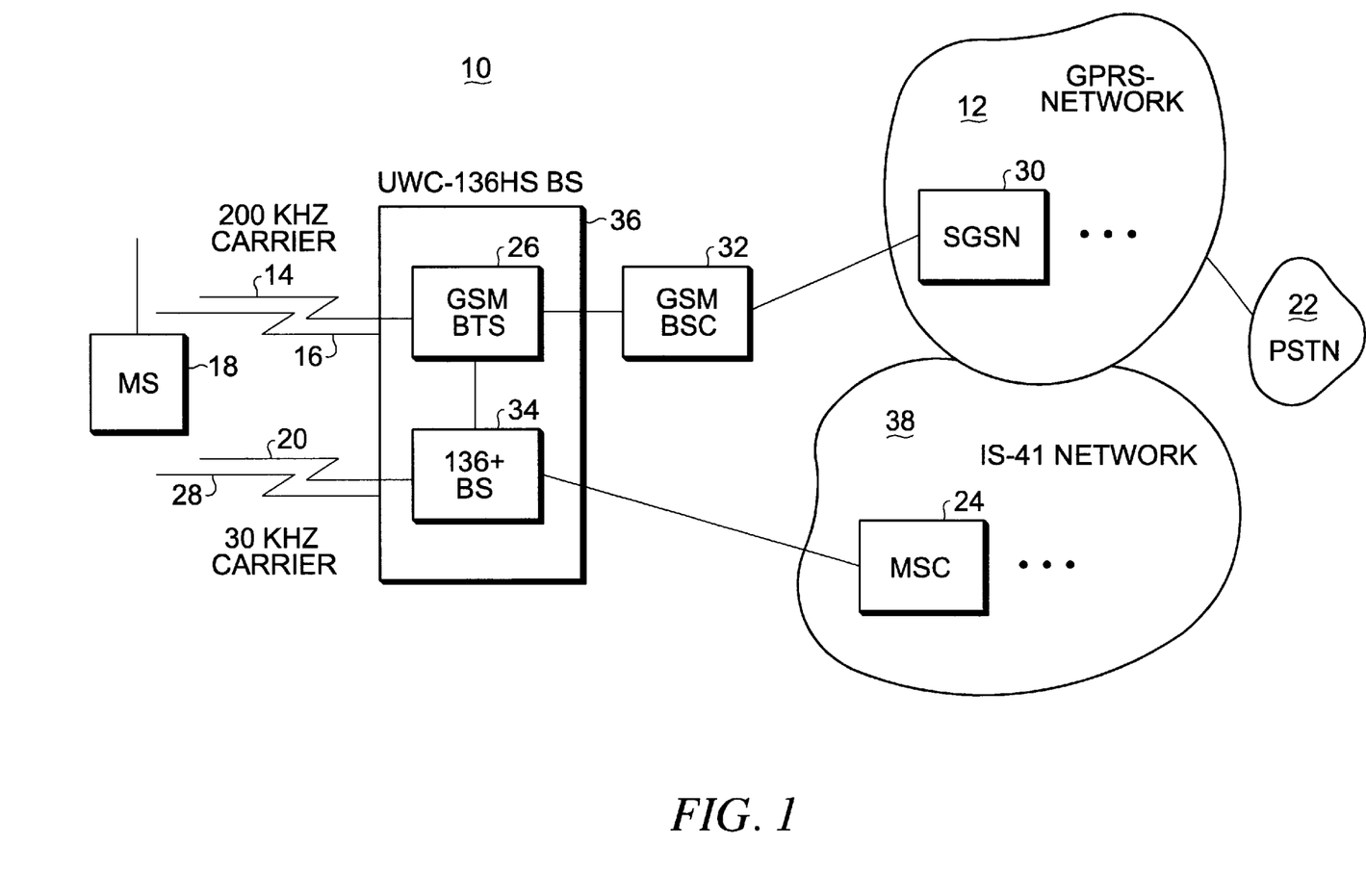
FIG. 1 illustrates a functional block diagram of a radio communication system in which an embodiment of the present invention is operable.

Referring first to FIG. 1, a radio communication system, shown generally at 10, is operable to communicate communication signals by way of radio communication channels defined upon the portion of the electromagnetic spectrum allocated to the communication system 10. The communication system 10 is here exemplary of a UWC-136 HS communication system, a so-called 3G (third generation), cellular communication system. The UWC-136 HS system integrates together portions of existing, cellular communication systems. Namely, the UWC-136 HS integrates together portions of an existing IS-136/136+ communication system and a GSM communication system.

The communication system 10 includes IS-41 network infrastructure 38 and GPRS network infrastructure 12. The GPRS network transceives communication signals, here forward link signals 14 and reverse link signals 16 with the mobile station 18. The IS-41 network transceives communication signals, here forward link signals 20 and reverse link signals 28 with the mobile station. Because no wire line connection is required to effectuate communications, communications effectuated by way of the communication system 10 are permitted irrespective of the availability of a wire line connection at a location at which the mobile station is positioned.

The UWC-136HS base station 36 has been defined here to include both an IS-136/136+ base station 34 and a GSM/EDGE base station 26. The GPRS network infrastructure 12 is here coupled to PSTN (public switched telephone network) 22. The GPRS network is shown to include a single SGSN (Serving GPRS Support Node) 30. Usually several SGSN's and other network nodes are included. The IS-41 network infrastructure 38 is here shown to include a single MSC 24. Usually several MSC's and other infrastructure nodes are included.

In the exemplary implementation in which the communication system 10 forms a UWC-136 HS system, the network infrastructure 38 of the system is operable, generally, pursuant to the standards set forth in the IS-136/136+ specification promulgated by the EIA/TIA. In an IS-136/136+ system, channels are defined to be of 30 kilohertz bandwidths and downlink signals 14 include synchronization signals which are used to synchronize mobile stations which receive such signals to the timing of the network infrastructure. When a mobile station becomes synchronized to the synchronization signals, signals transmitted and received by the mobile station are placed in time synchronization with the network infrastructure.

The mobile station 18 is constructed pursuant to the standards set forth in both GSM specifications and in IS-136/136+ specifications. The MS can, however, receive only one forward link signal at a time. Either it receives the GSM forward link signal 14 or the IS-136/136+ forward link signal 20. Through the embodiment of the present invention, the MS can become synchronized to the GSM forward signal when it has first become synchronized to the IS-136 forward signal. This synchronization to GSM forward signal can happen without the SCH, FCCH GSM control signals by utilizing the timing relationships between IS-136 and GSM time frames.

In one implementation of an embodiment of the present invention, the mobile station 18 includes apparatus for calculating a relative time offset between time frames defined at the IS-136 base station forward signal and the GSM base station forward signal. In another embodiment, such apparatus is located at the network infrastructure and the relative time offset determined thereat is provided to the mobile station by way of a downlink signal.

Figure 2:
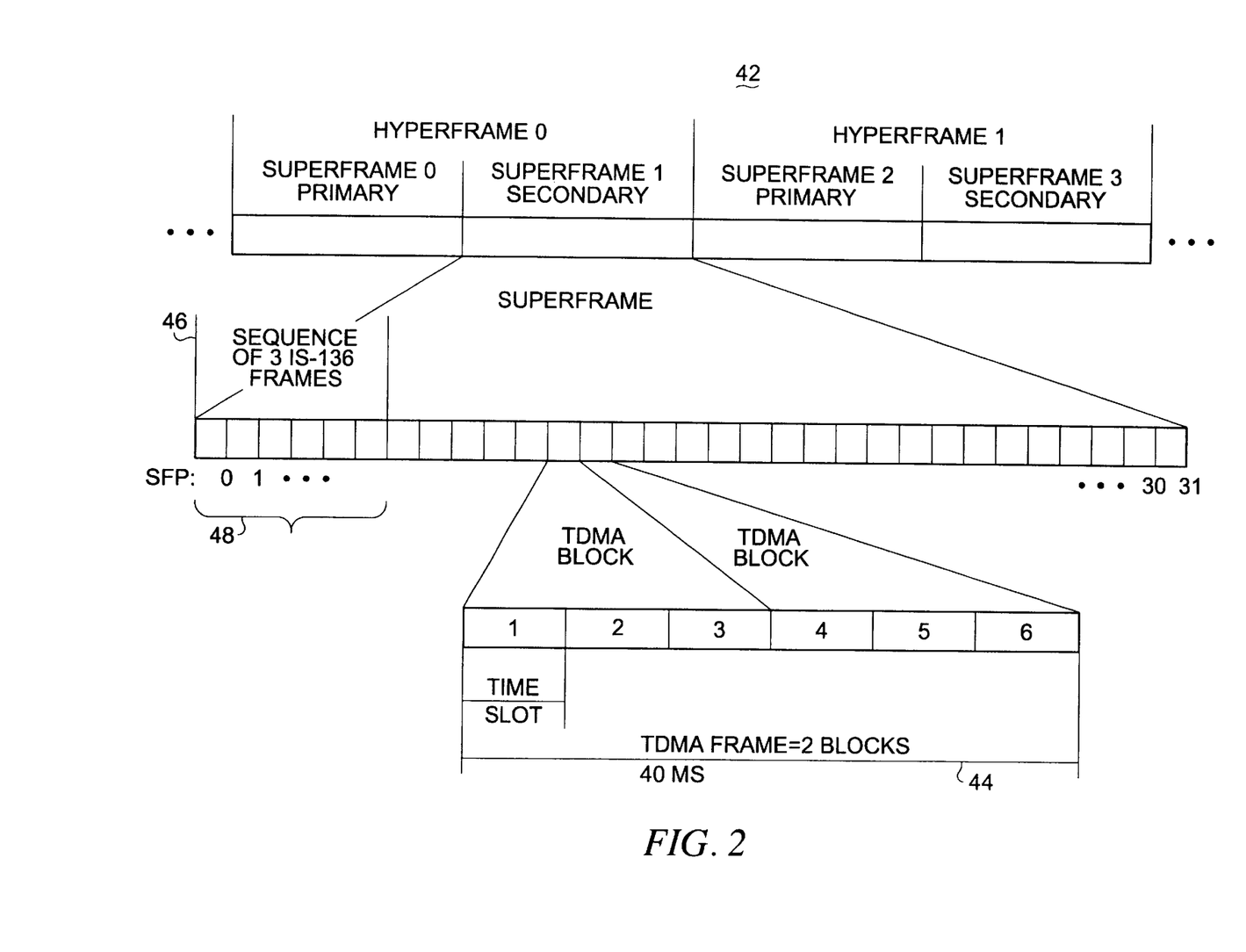
FIG. 2 illustrates the timing scheme defined in an IS-136/136+ cellular communication system pursuant to which the network infrastructure of the communication system shown in FIG. 1 is operable pursuant to an embodiment of the present invention. 136+ refers here to the TIA TR 45.3 GPRS-136 packet data proposal that adds GPRS protocols and 8-PSK modulation to the 136 standard.

FIG. 2 illustrates the timing scheme, shown generally at 42, defined in the IS-136/136+ communication system. The IS-136 communication system is a TDMA (time-division, multiple-access) system in which a channel is defined as a carrier frequency/time slot combination. The timing scheme 42 indicates a manner by which a single carrier frequency is time-divided. While not separately illustrated, additional carrier frequencies are analogously also divided into a plurality of time slots. Groups of sequentially-positioned time slots together form a frame. And, the Figure illustrates a plurality of frames 44, each formed of groups of sequentially-positioned time slots. Each of the frames 44 is defined by an IS-136 frame number. The IS-136 frame number is defined here to be an integer number between zero and 313343. This definition of IS-136 frame number has been done because 313344 IS-136 frames are exactly the length of one GSM hyperframe. The concept of a start frame number (SFN) is also made, as shown in FIG. 3B. The SFN defines the IS-136 frame number of that IS-136 frame during which the GSM frame with the GSM frame number 0 starts, i.e., the GSM hyperframe starts.

A group of three frames 44 defines a sequence 48 of three IS-136 frames 48. Each of the sequences 48 is defined by a sequence number (SN). A first sequence 48 starting at zero time 46 is defined by an SN=zero.

Figure 3A:
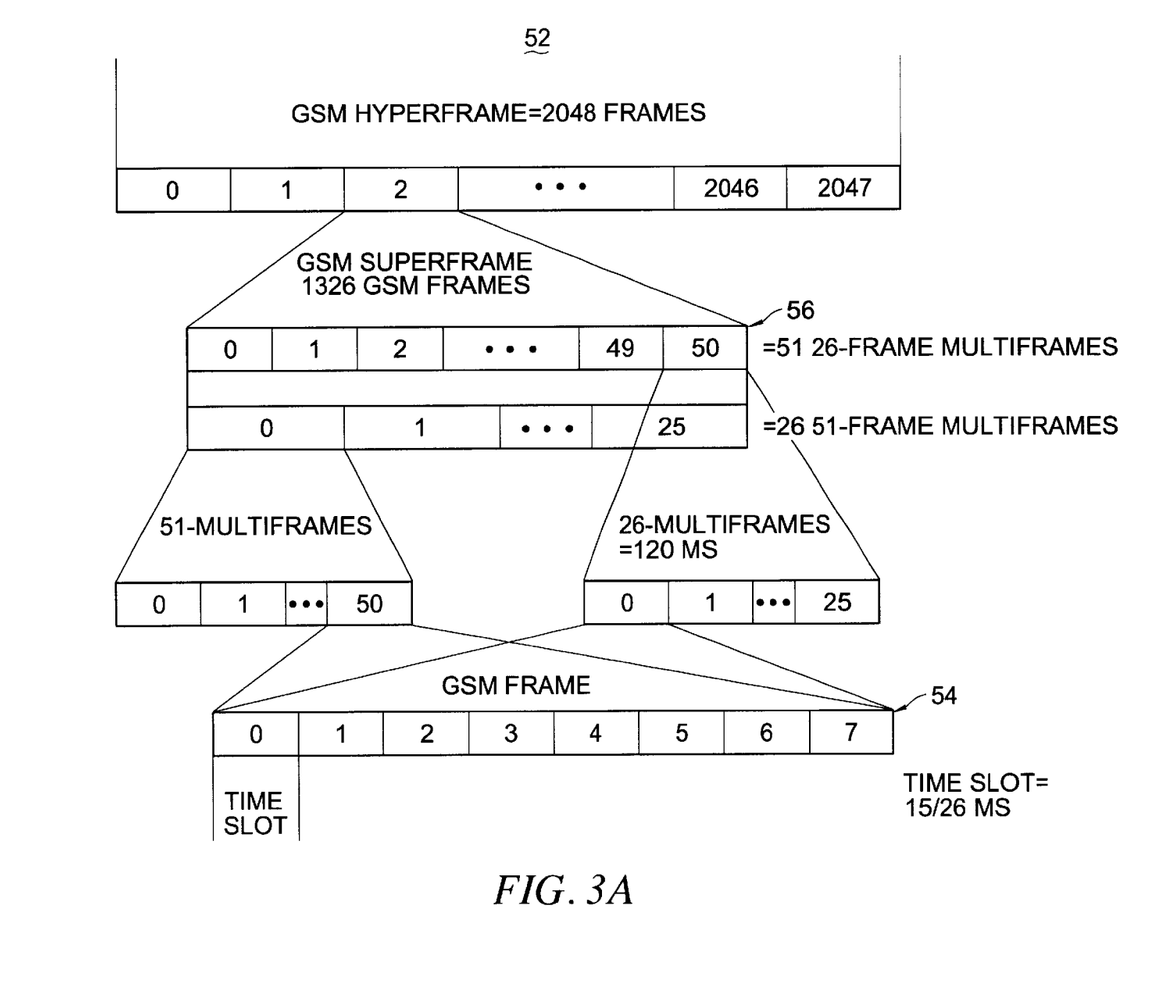
FIG. 3A illustrates the timing scheme defined in a GSM cellular communication system pursuant to which the mobile station of the communication system shown in FIG. 1 is operable in an embodiment of the present invention.
Figure 3B:
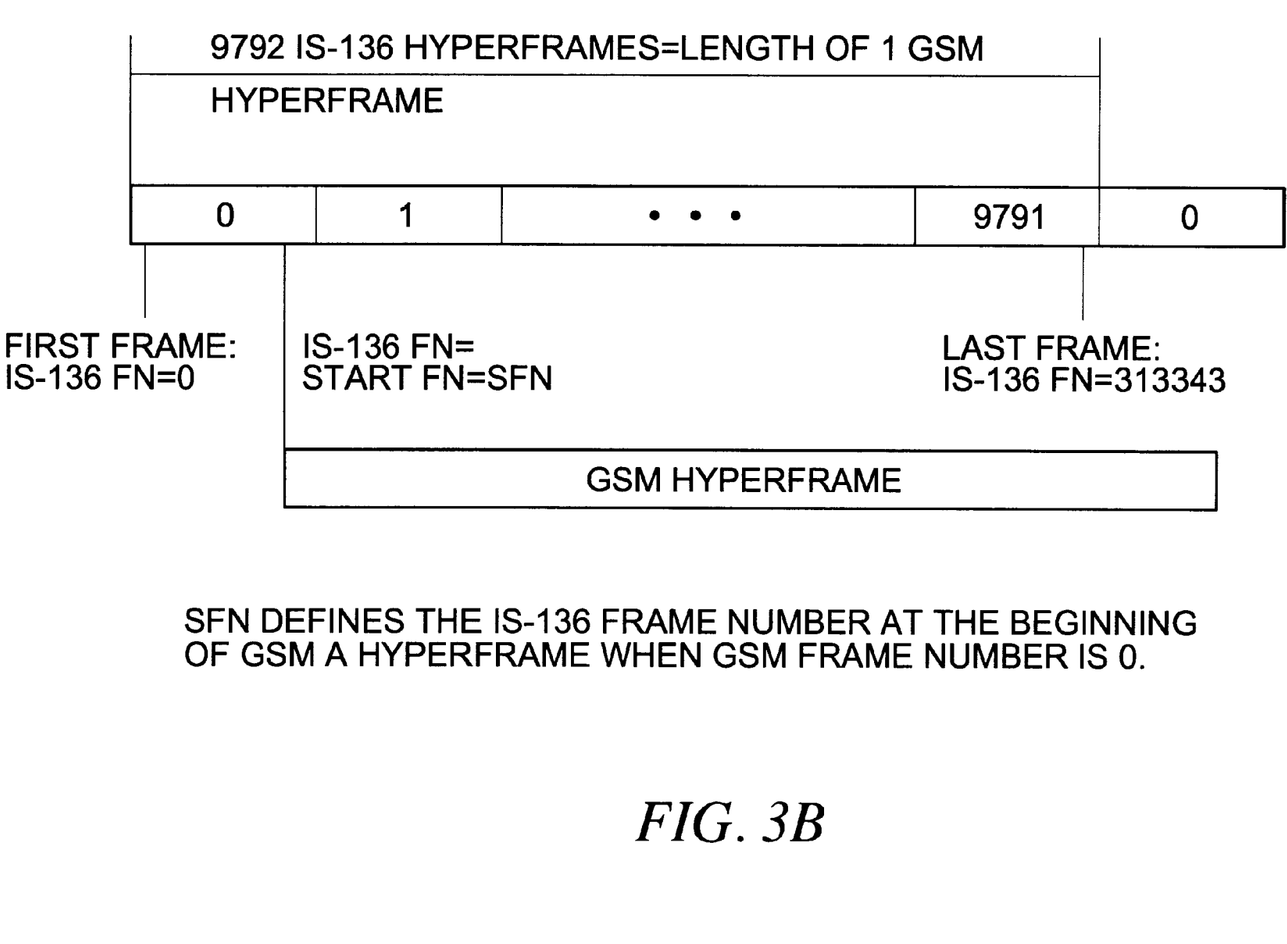
FIG. 3B illustrates the relationship between a GSM hyperframe and an IS-136 hyperframe and an SFN (start frame number) defined in the IS-136 interim standard.

FIG. 3 illustrates the timing scheme, shown generally at 52, defined in the GSM specification. A GSM system is also a TDMA system, again in which a channel is defined by a time slot/carrier combination. While only a single carrier frequency is illustrated in the Figure, other carrier frequencies can similarly be shown. Groups of sequentially-positioned time slots defined in the GSM system form GSM frames 54, and groups of twenty-six frames 54 define a multi-frame 56. A time slot defined in the GSM system is of a duration of 15/26 ms, and a frame 54 is of a duration of 120/26 ms. A superframe defined in the GSM system is formed of 26*51 GSM frames 54, and a hyperframe is defined to be 2,048 GSM superframes.

Figure 4:
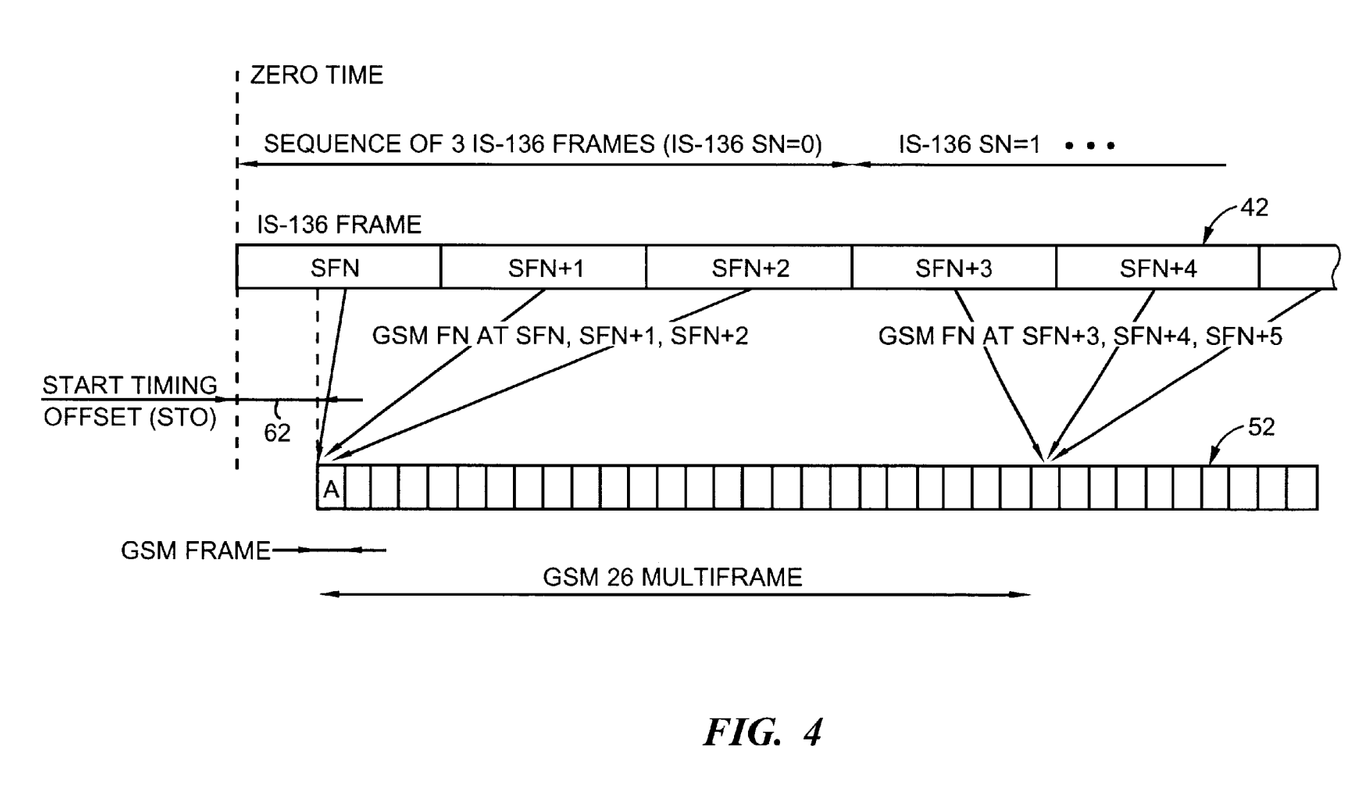
FIG. 4 illustrates the relationship between the timing definitions of the IS-136 system, shown in FIG. 2, and the timing definitions of the GSM system, shown in FIG. 3.

FIG. 4 illustrates the timing scheme 42, shown in FIG. 2, together with the timing scheme 52, shown in FIG. 3. The timing scheme 42 represents the timing scheme pursuant to which the IS-136 base station 34 is operable and the timing scheme 52 represents the timing scheme pursuant to which the GSM base station 26 is operable. A relative timing offset indicated by the line segment 62 is exemplary and representative of a relative time offset between the timing schemes of the IS-136 base station and the GSM base station belonging to the same UWC-136HS base station 36. Also, the symbolic value SFN (=start frame number) is exemplary and represents the value of the IS-136 frame number (0 . . . 313343) of that IS-136 frame during which the GSM frame with GSM frame number 0 starts (=the GSM hyperframe starts). Either of the following can be assumed:

1) The IS-136 base station 34 and the GSM base station 26 are synchronized so that the start timing offset and the start frame number (SFN) have the same default values in every UWC-136HS cell. If this is the case the start timing offset and start frame number values do not need to be sent to the MS in the IS-136 forward channel 20. The most natural default values for both SFN and start timing offset would be zero but also other values are possible.

2) The SFN is an arbitrary number between 0 . . . 313343 and the start timing offset is an arbitrary number between 0 . . . 40000 microseconds. These values may vary from one UWC-136HS cell to another. If this is the case both the start frame number and start timing offset values need to be sent to the mobile station through the IS-136 forward channel 20 of the UWC-136HS base station 36.

In one embodiment of the present invention, the MS 18 is synchronized to the IS-136 forward DCCH signal of the UWC-136HS base station 36. The UWC-136HS base station assigns a temporary block flow on a GSM packet traffic channel to the MS by sending to it a Packet Uplink Assignment or Packet Downlink Assignment message through he IS-136 forward DCCH 20. (These messages have been defined in GSM specification 04.60 Version 6.0.0.) The Packet Uplink or Downlink Assignment Message includes the following parameters:

TBF_STARTING_TIME=Indicates the future GSM frame number at which the MS is supposed to start transmission/reception on the assigned GSM channel 14/16

TIMESLOT_ALLOCATION=The GSM time slot allocated to the MS on the GSM channel

PACKET_TIMING_ADVANCE=Timing advance that MS is supposed to use in transmission on the assigned GSM channel (for simplicity the timing advance is not dealt with in this example)

The example embodiment of the present invention lets the MS calculate the time difference (=timing offset) from its current IS-136 frame/time slot on IS-136 DCCH to the GSM frame/time slot defined by the above parameters. The rest of this example deals with this calculation. For simplicity the PACKET_TIMING_ADVANCE is omitted.

Additions to the BCCH information elements defined in the IS-136-A system are not required. The only alterations to existing standards are to add the GPRS Packet Uplink Assignment Message and Packet Downlink Assignment Message to IS-136 DCCH or to add corresponding information elements to existing messages on IS-136 DCCH. Also, the GSM BSIC (Base Station Identity Code) needs to be added to DCCH information elements. These additions will enable the MS 18 to synchronize from IS-136/136+ DCCH to GSM/GPRS/EDGE packet traffic channel.

The mobile station 18 is initially tuned, for instance, to the IS-136 DCCH at a particular IS-136 frame number and at a particular IS-136 time slot, in which there are six time slots per frame. The mobile station 18 receives a packet uplink or downlink assignment message to a GSM/GPRS/EDGE carrier of the same cell together with frequency parameters, a TBF starting time, and a GSM time slot of which there are eight time slots per frame. Responsive thereto, the mobile station 18 calculates the timing offset from the current IS-136 frame and time slots to a GSM time slot and frame number corresponding to the TBF starting time.

Figure 5:
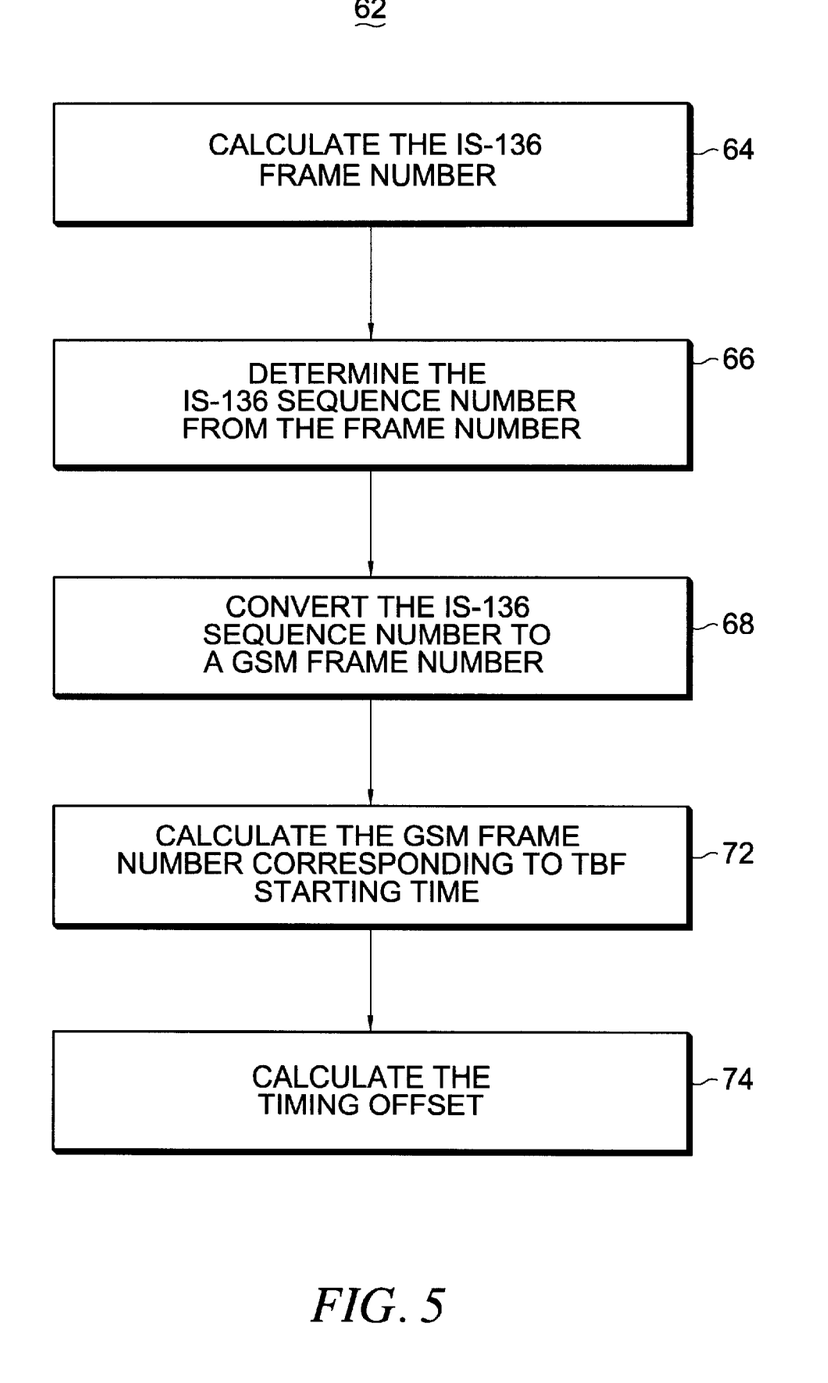
FIG. 5 illustrates a method flow diagram which lists the method steps of the method of an embodiment of the present invention.

FIG. 5 illustrates a method, shown generally at 62, by which the relative timing offset 56 (which equals time distance) between the current IS-136 frame number, time slot and the allocated GSM frame number corresponding to the TBS starting time and allocated GSM time slot is determined. (Viz., a constant known timing difference is assumed to exist between the start of GSM hyperframe and the start of the IS-136 frame during which the GSM hyperframe starts. This item is called start timing offset. It may have a different value for each UWC-136HS base station or it may have a default value (e.g. 0) which is the same for each base station. This starting timing offset value is included as a parameter to the presented calculations in order to make them more general. The same applies to the SFN=start frame number.) First, and as indicated by the block 64, the mobile station calculates the IS-136 frame number from the information provided thereto on the DCCH burst and on the F-BCCH. The IS-136 frame number, IS136_FN, is calculated by the following equation:

$$(IS136\_FN) = CBN\_high*8*12*2*16 + EHFC*12*2*16 + HFC*2*16 + PSFI*16 + SFP/2$$

wherein:
CBN_high is an optional information element on the IS-136 F-BCCH and counts when the extended hyperframe counter wraps-around;
EHFC is the extended hyperframe counter, also an optional information element on the IS-136 F-BCCH and counts when a hyperframe counter wraps-around;
HFC is the hyperframe counter which is a mandatory information element on the IS-136 F-BCCH and counts hyperframes from zero to eleven;
PSFI is a primary superframe indicator, a mandatory information element on the IS-136 F-BCCH which counts superframes zero . . . 1; and SFP is a superframe phase coded in DCCH bursts and counts IS-136 blocks between zero and thirty-one.

It is assumed that the EHFC and CBN-high optional information elements are implemented on the F-BCCH of the UWC-136HS cell and that the CBN high counts 0 . . . 67, over a GSM hyperframe.

Through this calculation of IS136_FN, a unique frame number can be given to every IS-136 frame in every sequence 48 of three IS-136 frames for all IS-136 sequence numbers, SN, of zero . . . 104447.

Next, and as indicated by the block 66, the IS-136 sequence number, IS136_SN is defined by the following equation:

$$IS136\_SN=(IS136\_FN\text{-}SFN)/3$$

wherein:

IS136_FN is the IS-136 frame number; and

SFN is the start frame number, the above calculation being modulo 313344.

Then, and as indicated by the block 68, the IS136_SN is converted to a corresponding GSM frame number by the following equation:

$$GSM\_FN\_AT\_IS136\_FN=IS136\_SN*26$$

It is defined here so that every IS-136 frame in the same sequence 48 of three IS-136 frames has the same corresponding GSM frame number. This GSM frame number is defined to be the GSM frame number of the first frame 54 of the multi-frame 56 corresponding to the sequence 48 containing the appropriate IS-136 frame 44. Other definitions are also possible. For instance, alternatively, each IS-136 frame number could instead have a different corresponding GSM frame number.

Thereafter, and as indicated by the block 72, the GSM frame number corresponding to the TBF starting time is calculated in the manner defined in the GSM standard specification, Section No. 04.08.

Then, and as indicated by the block 74, the timing offset from the current IS-136 frame/slot to an assigned GSM frame/slot is defined as follows:

Timing offset=start_timing_offset+(START_GSM_FN-GSM_FN_AT_IS136_FN)*gsm_frame_duration+GSM_TS*gsm_time_slot_duration-((IS136_FN-SFN)mod3)*is 136_frame_duration-(IS136_TS-1)*is136_time_slot_duration wherein the variables are defined as above-noted, or are as follows:

START_GSM_FN is the allocated GSM frame number corresponding to the TBF starting time;

GSM_TS is the number of the GSM time slot which was allocated to the mobile; and IS136_TS is the current time slot of the mobile on the IS-136 DCCH.

The timing offset can thereafter be utilized for synchronization purposes.

Figure 6:
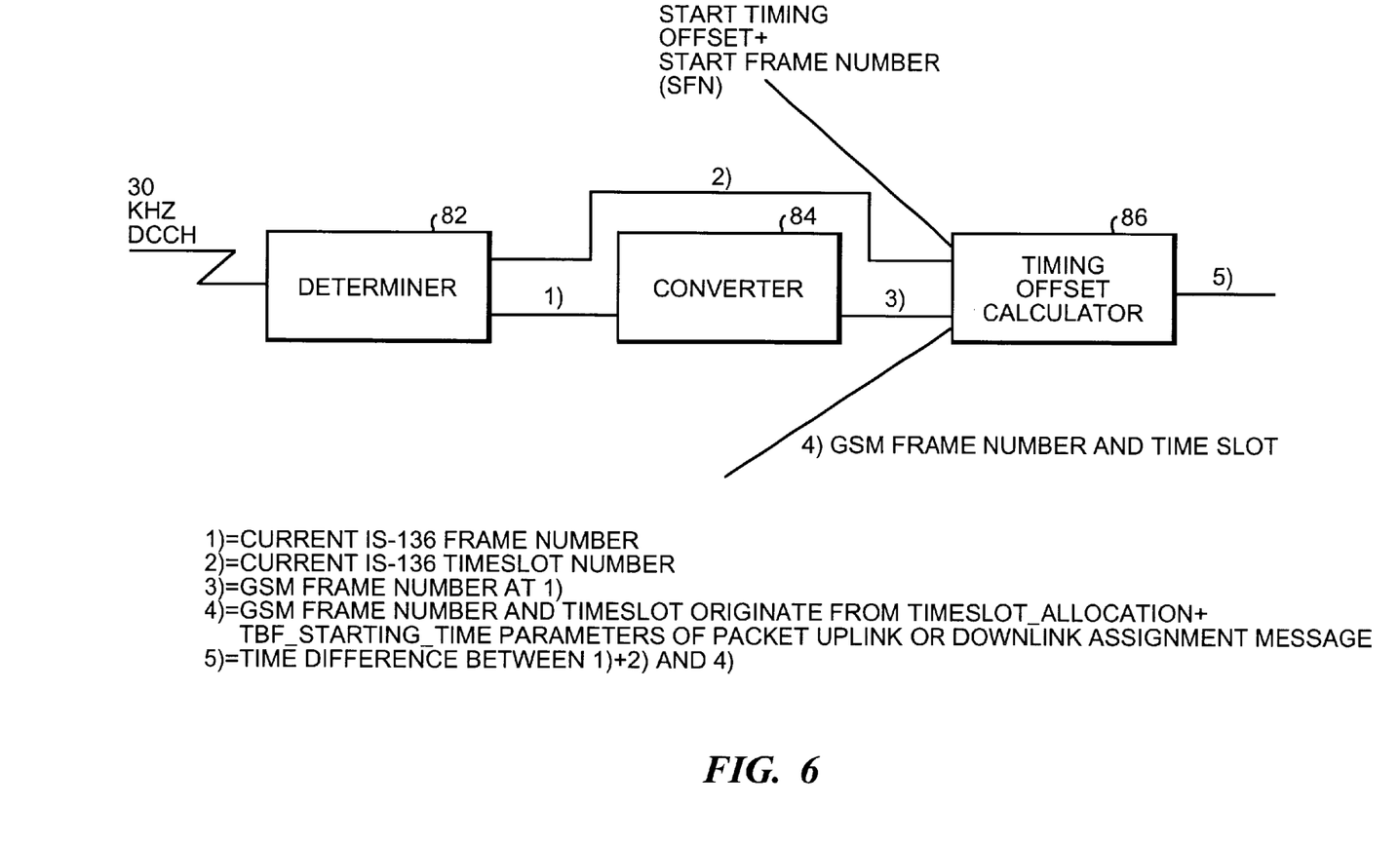
FIG. 6 illustrates a functional block diagram of apparatus of an embodiment of the present invention which calculates a relative time offset between frames defined in the IS-136 and GSM systems.

FIG. 6 illustrates part of the mobile station 18, shown previously in FIG. 1, which forms a portion of the communication system 10. Here, apparatus which calculates the timing offset is functionally shown. A determiner is coupled to receive the IS-136 DCCH forward signal and to determine the IS-136 frame number, and IS-136 time slot number. A converter 84 is operable responsive to the IS-136 frame number from the determiner. The converter produces the GSM frame number corresponding to the IS-136 frame number. And, a timing offset calculator 86, operable responsive to the GSM frame number corresponding to the IS-136 frame number, allocated GSM frame number (START_GSM_FN) and time slot, start timing offset and start frame number (SFN). The timing offset calculator produces the timing offset between the current IS-136 frame, time slot and the allocated GSM frame number (START_GSM_FN), time slot. In an alternate embodiment, the determiner, converter, and offset calculator instead form portions of the network infrastructure and a signal representative of the calculations performed thereat are provided to the mobile station.

Thereby, synchronization of the mobile station 18 with the network infrastructure can be performed more quickly and without the need for the synchronization signals conventionally utilized in a GSM communication system.

The previous descriptions are of preferred examples for implementing the invention, and the scope of the invention should not necessarily be limited by this description. The scope of the present invention is defined by the following claims.

We claim:

1. In a communication system in which network infrastructure is operable to generate a synchronization signal pursuant to a first TDMA (time-division, multiple-access) communication scheme having a first time frame definition defined therein, and a mobile station operable pursuant to a second TDMA communication scheme having a second time frame definition defined therein, an improvement of apparatus for calculating a relative time offset by which to offset the synchronization signal, thereby to permit synchronizing of the mobile station to the synchronization signal, said apparatus comprising:

a determiner coupled to receive the synchronization signal and operable responsive thereto, said determiner for determining an order number representative of a first-communication-scheme time frame located within a sequence of the first-communication-scheme time frame at a selected determining time;

a converter operable responsive to the order number determined by said determiner, said converter for converting the order number to a corresponding frame number of a second-communication-scheme time frame number; and a timing offset calculator operable responsive to a value representative of the second-communication-scheme time frame number formed by said converter, said timing offset calculator for calculating a relative time offset between a current frame and time slot in the sequence of the first-communication-scheme time frames, the order number of which said determiner determines, and an allocated frame and time slot in the sequence of second communication-scheme time frames.

2. The apparatus of claim 1 wherein said determiner, said converter, and said timing offset calculator form portions of the mobile station.

3. The apparatus of claim 1 wherein said determiner, said converter, and said timing offset calculator form portions of the network infrastructure.

4. The apparatus of claim 1 wherein the sequence of the first-communication-scheme time frames is of a number of time frames such that the sequence of the first-communication-scheme time frames and the corresponding sequence of second-communication-scheme time frames are of common temporal durations.

5. The apparatus of claim 4 wherein the sequence of the first-communication-scheme time frames comprises three first-communication-scheme time frames and wherein the corresponding sequence of second-communication-scheme time frames comprises twenty-six second-communication-scheme time frames.

6. The apparatus of claim 4 wherein the time duration of a sequence of the second-communication scheme time frames comprises an integral multiple of the time duration of the sequence of the first-communication scheme time frames so that all frame numbers of both communication schemes are contained in the above sequences at least once.

7. The apparatus of claim 5 wherein the first TDMA communication scheme comprises an IS-136 cellular communication scheme, wherein the second TDMA communication scheme comprises a GSM (Global System for Mobile Communications) communication scheme, and wherein said determiner determines the order number responsive to reception of a downlink assignment message generated on a DCCH (digital control channel).

8. The apparatus of claim 5 wherein the first TDMA communication scheme comprises an IS-136 cellular communication scheme and wherein said determiner calculates a uniquely-numbered frame number representative of the first-communication-scheme time frame at the selected determining time and thereafter determines the order number of the first-communication-scheme time frame at the selected determining time therefrom.

9. The apparatus of claim 8 wherein the order number is determined by said determiner to be one-third of a difference value of the uniquely-numbered frame number subtracted by a start frame number value.

10. The apparatus of claim 9 wherein the second TDMA communication scheme comprises a GSM (Global System for Mobile Communications)/EDGE (Enhanced Data rates for GSM Evolution) communication scheme and wherein said converter converts the order number of the frame at the selected determining time is converted into the corresponding frame number of the GSM communication scheme.

11. The apparatus of claim 10 wherein the frame number of the GSM communication scheme into which the order number of the frame is converted by said converter comprises the frame number of a first frame in the corresponding sequence of the second-communication-scheme time frames.

12. The apparatus of claim 11 wherein said timing offset calculator is operable responsive to the number of the first frame in the corresponding sequence of the second-communication-scheme time frames.

13. The apparatus of claim 12 wherein the relative time offset calculated by said timing offset calculator comprises an offset between the first-communication-scheme time frame identified by the order number determined at the selected determining time, the current time slot and the allocated time frame number and time slot on the GSM communication scheme.

14. A method for calculating a relative time offset by which to offset a synchronization signal generated at network infrastructure of a communication system, the network infrastructure operable pursuant to a first TDMA (time-division, multiple-access) communication scheme having a first time frame definition defined therein, the communication system further having a mobile station operable pursuant to a second TDMA communication scheme having second time frame definition defined therein, said method comprising:

determining, responsive to the synchronization signal, an order number representative of a first-communication-scheme time frame located within a sequence of the first-communication-scheme time frames at a selected determining time;

converting the order number determined during said operation of determining to a corresponding frame number of a second-communication-scheme time frame number; and using the determined first-communication scheme time frame number and converted second-communication scheme time frame number for calculating the relative time offset between the frame number and time slot of the first-communication scheme time frame sequence and communication scheme time frame sequence.

15. The method of claim 14 comprising the additional operation of synchronizing the mobile station to the synchronizing signal, offset by the relative time offset, calculated during said operation of calculating.

16. The method of claim 14 wherein said operations of determining, converting, and calculating are performed at the mobile station.

17. The method of claim 14 wherein said operations of determining, converting, and calculating are performed at the network infrastructure.

18. The method of claim 14 wherein the sequence of the first-communication-scheme time frames is of a number of time frames such that the sequence of the first-communication-scheme time frames is of a number of time frames such that the sequence of the first-communication-scheme time frames and the corresponding sequence of second-communication-scheme time frames are of common temporal durations.

19. The method of claim 14 wherein said operation of determining comprises first calculating a uniquely-numbered frame number representative of the first-communication-scheme time frame at the selected determining time and thereafter determining the order number of the first-communication-scheme time frame responsive to the uniquely-numbered frame number.

20. The method of claim 19 wherein the first TDMA communication scheme comprises an IS-136 cellular communication scheme, wherein the second TDMA communication scheme comprises a GSM communication scheme, and wherein said operation of converting converts the order number of the frame defined pursuant to the IS-136 communication scheme into the corresponding frame number of the GSM communication scheme.

21. The method of claim 20 wherein the frame number of the GSM communication scheme into which the order number of the frame is converted during said operation of converting comprises the frame number of a first frame in the corresponding sequence of the second-communication-scheme time frames.

22. A multi-modemo bile station operable in a communication system in which network infrastructure is operable to generate a synchronization signal pursuant to a first TDMA (time-division, multiple-access) communication scheme having a first time frame definition defined therein, and the mobile station operable pursuant to a second TDMA communication scheme having a second time frame definition defined therein, an improvement of apparatus for calculating a relative time offset by which to offset the synchronization signal, thereby to permit synchronizing of the mobile station to the synchronization signal, said mobile station comprising:

a determiner coupled to receive the synchronization signal and operable responsive thereto, said determiner for determining an order number representative of a firstcommunication-scheme time frame located within a sequence of the first-communication-scheme time frame at a selected determining time;

a converter operable responsive to the order number determined by said determiner, said converter for converting the order number to a corresponding frame number of a second-communication-scheme time frame number; and a timing offset calculator operable responsive to a value representative of the second-communication-scheme time frame number formed by said converter, said timing offset calculator for calculating a relative time offset between a current frame and time slot in the sequence of the first-communication-scheme time frames, the order number of which said determiner determines, and an allocated frame and time slot in the sequence of second communication-scheme time frames.

* * * * *